(12) United States Patent
Roscoe et al.

(10) Patent No.: US 7,929,260 B2
(45) Date of Patent: Apr. 19, 2011

(54) ARC FLASH ELIMINATION SYSTEM, APPARATUS, AND METHOD

(75) Inventors: George William Roscoe, West Hartford, CT (US); Thangavelu Asokan, Bangalore (IN); Adnan Kutubuddin Bohori, Bangalore (IN)

(73) Assignee: General Electric Company, Schenectady, NY (US)

( * ) Notice: Subject to any disclaimer, the term of this patent is extended or adjusted under 35 U.S.C. 154(b) by 439 days.

(21) Appl. No.: 11/847,526

(22) Filed: Aug. 30, 2007

(65) Prior Publication Data

US 2008/0239592 A1 Oct. 2, 2008

Related U.S. Application Data

(63) Continuation-in-part of application No. 11/693,849, filed on Mar. 30, 2007, now Pat. No. 7,821,749.

(51) Int. Cl.
*H02H 3/00* (2006.01)
(52) U.S. Cl. ............................................. 361/2; 361/131
(58) Field of Classification Search ................ 361/2–14, 361/62–70, 120, 129–131; 218/9, 119
See application file for complete search history.

(56) References Cited

U.S. PATENT DOCUMENTS

| | | | |
|---|---|---|---|
| 3,575,680 A * | 4/1971 | Beaudoin et al. | ............. 335/201 |
| 3,997,235 A | 12/1976 | Boliver | |
| 4,259,704 A | 3/1981 | Hamann | |
| 4,289,941 A | 9/1981 | Cannon | |
| 4,347,414 A | 8/1982 | Headley et al. | |
| 4,369,364 A | 1/1983 | Kuntermann | |
| 4,409,447 A | 10/1983 | Noeske | |
| 4,431,946 A * | 2/1984 | O'Loughlin | .................. 315/150 |
| 4,645,889 A | 2/1987 | Howell | |
| 5,231,242 A * | 7/1993 | Chryssomallis et al. | ........... 89/8 |
| 5,650,902 A | 7/1997 | Schau | |
| 5,905,244 A | 5/1999 | Smith et al. | |
| 5,933,308 A | 8/1999 | Garzon et al. | |
| 6,128,168 A | 10/2000 | Arnold et al. | |
| 6,141,192 A | 10/2000 | Garzon | |
| 6,207,916 B1 | 3/2001 | Pniok et al. | |
| 6,232,857 B1 | 5/2001 | Mason, Jr. et al. | |
| 6,242,707 B1 | 6/2001 | Mody et al. | |
| 6,417,671 B1 | 7/2002 | Tiemann | |
| 6,433,976 B1 | 8/2002 | Phillips | |
| 6,532,140 B1 | 3/2003 | McMahon et al. | |
| 6,633,009 B1 | 10/2003 | Shea | |

(Continued)

FOREIGN PATENT DOCUMENTS

DE 4236623 A1 5/1994

(Continued)

OTHER PUBLICATIONS

Pulsed Power. Mesyats, Gennady A. Dec. 21, 2004.*

(Continued)

*Primary Examiner* — Jared J Fureman
*Assistant Examiner* — Christopher J Clark
(74) *Attorney, Agent, or Firm* — Cantor Colburn LLP

(57) ABSTRACT

A method of eliminating arc flash in a motor control center is disclosed. The method includes sensing an arc flash corresponding to the motor control center. In response to sensing the arc flash, and subsequent to a delay, determining whether the arc flash continues, and in response to determining that the arc flash continues, triggering an arc crowbar.

13 Claims, 7 Drawing Sheets

U.S. PATENT DOCUMENTS

| | | | |
|---|---|---|---|
| 6,650,516 B2 * | 11/2003 | Langford et al. | 361/42 |
| 6,657,150 B1 | 12/2003 | Shea et al. | |
| 6,683,764 B1 | 1/2004 | Pniok | |
| 6,751,528 B1 | 6/2004 | Dougherty | |
| 6,839,209 B2 | 1/2005 | Shea et al. | |
| 6,952,332 B2 | 10/2005 | Slade et al. | |
| 7,062,388 B2 | 6/2006 | Rivers, Jr. et al. | |
| 2003/0231440 A1 * | 12/2003 | Papallo et al. | 361/3 |
| 2003/0231443 A1 | 12/2003 | Shea et al. | |
| 2003/0231453 A1 | 12/2003 | Shea | |
| 2005/0152078 A1 * | 7/2005 | Shea et al. | 361/2 |

FOREIGN PATENT DOCUMENTS

| | | |
|---|---|---|
| EP | 688071 A1 | 8/1999 |
| EP | 771057 A1 | 9/2000 |
| JP | 04255421 A | 9/1992 |
| JP | 04289721 A | 10/1992 |
| JP | 05003611 A | 1/1993 |
| WO | 9522167 A2 | 8/1995 |
| WO | 9835237 A2 | 8/1998 |
| WO | 9921254 A1 | 4/1999 |
| WO | 9921255 A1 | 4/1999 |
| WO | 2005036709 A1 | 4/2005 |

OTHER PUBLICATIONS

Publication Titled: Bypass Gap, by GE Transmission, Distribution & Industrial Systems regarding Series Compensation Systems, dated Nov. 14, 1999.

* cited by examiner

ARC FLASH ELIMINATION SYSTEM, APPARATUS, AND METHOD

CROSS REFERENCE TO RELATED APPLICATIONS

This application is a continuation-in-part application of U.S. application Ser. No. 11/693,849, filed Mar. 30, 2007, the contents of which are incorporated herein by reference in their entirety.

BACKGROUND

The present invention relates to arc flash prevention and mitigation technologies, and particularly relates to electrical crowbar devices for this purpose.

Electric power circuits and switchgear have conductors separated by insulation. Air space often serves as part or all of this insulation in some areas. If the conductors are too close to each other or voltage exceeds the insulation properties, an arc can occur between conductors. Air or any insulation (gas or solid dielectrics) between conductors can become ionized, making it conductive, which enables arcing. Arc temperature can reach as high as 20,000° C., vaporizing conductors and adjacent materials, and releasing significant energy.

Arc flash is the result of a rapid energy release due to an arcing fault between phase-phase, phase-neutral, or phase-ground. An arc flash can produce high heat, intense light, pressure waves, and sound/shock waves. However, the arc fault current is usually much less than a short circuit current, and hence delayed or no tripping of circuit breakers is expected unless the breakers are selected to handle an arc fault condition. Agencies and standards such as the National Environmental Policy Act (NEPA), Occupational Safety and Health Administration (OSHA), and Institute of Electrical and Electronics Engineers (IEEE) regulate arc flash issues through personal protective clothing and equipment, but there is no device established by regulation to eliminate arc flash.

Standard fuses and circuit breakers typically do not react fast enough to an arc flash. An electrical "crowbar" is a protection device that intentionally shorts an electrical circuit and thus diverts the electrical energy away from the arc flash. The intentional 3-phase short circuit fault thus created is then cleared by tripping a fuse or circuit breaker, and shutting down the power. Common arc flash mitigation devices utilize mechanical and/or electro-mechanical processes that may allow significant levels of current resulting from the intentional short-circuit. Accordingly, there is a need in the art for a arc flash elimination arrangement that overcomes these drawbacks.

BRIEF DESCRIPTION OF THE INVENTION

An embodiment of the invention includes a method of eliminating arc flash in a motor control center. The method includes sensing an arc flash corresponding to the motor control center. In response to the sensing, and subsequent to a delay, determining whether the arc flash continues, and in response to determining that the arc flash continues, triggering an arc crowbar.

Another embodiment of the invention includes a motor control center that includes a circuit branch, a current limiting circuit breaker in fault-protection communication with the circuit branch, and an arc crowbar in power connection with the motor control center. The current limiting circuit breaker is responsive to a level of current within the circuit branch to interrupt current therein, and the arc crowbar is responsive to an arc flash condition of a sustained, defined duration corresponding to the motor control center to eliminate the arc flash condition.

Another embodiment of the invention includes a power distribution system. The power distribution system includes a switchgear and a motor control center in power connection with the switchgear. The motor control center includes a circuit branch, a current limiting circuit breaker in fault-protection communication with the circuit branch, and an arc crowbar in power connection with the motor control center. The current limiting circuit breaker is responsive to a level of current within the circuit branch to interrupt current therein, and the arc crowbar is responsive to an arc flash condition of a sustained, defined duration corresponding to the motor control center to eliminate the arc flash condition.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
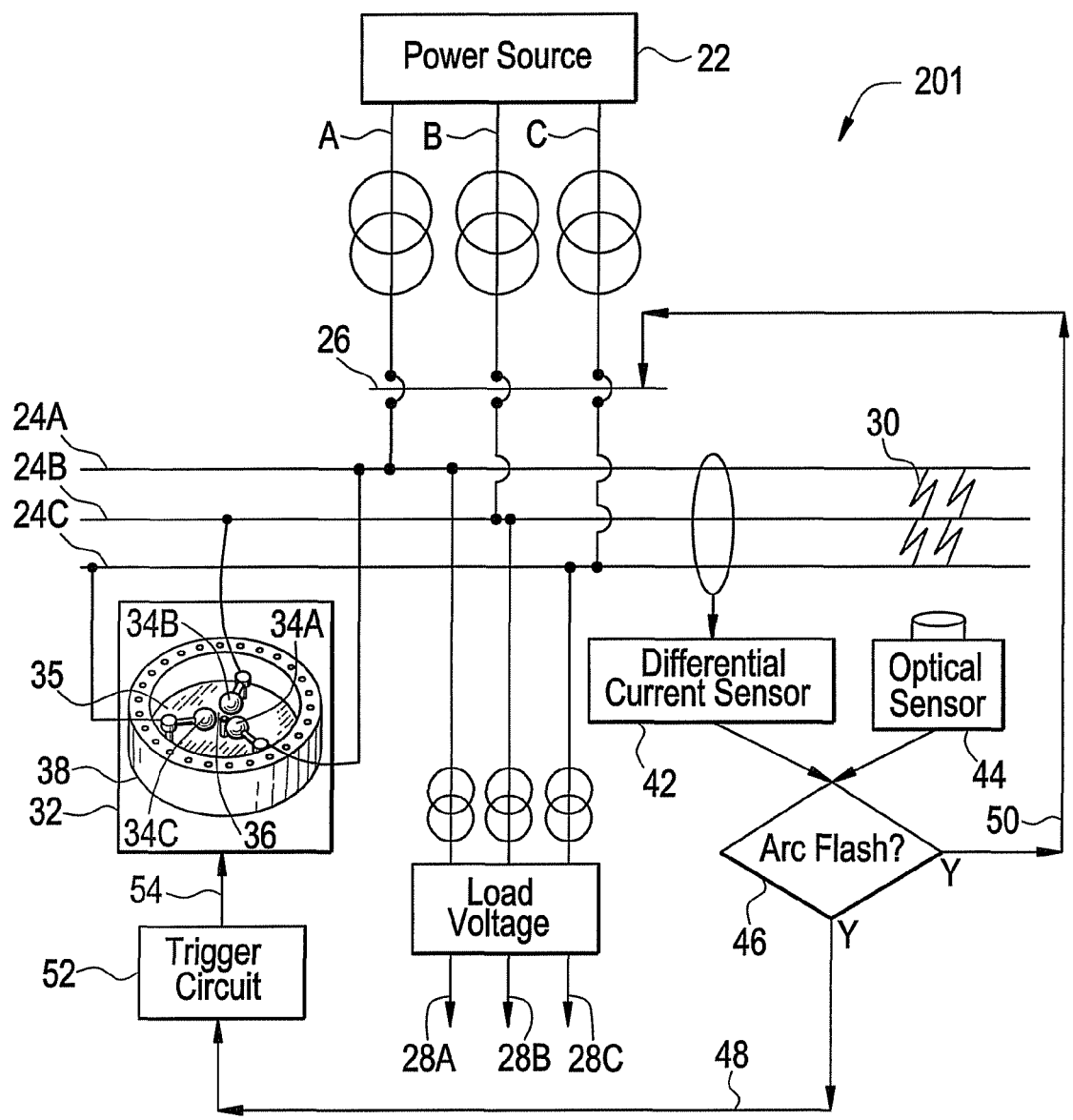
FIG. 1 is schematic view of an electrical circuit with an arc crowbar and activation circuits in accordance with an embodiment of the invention.

The inventors of embodiments of the present invention have innovatively recognized that a controlled arc can act as an electrical crowbar for arc flash elimination, and that such a controlled arc can be faster than existing crowbars, providing enhanced circuit protection. FIG. 1 shows an electrical circuit 201 with a power source 22, providing 3-phase electrical power A, B, C to three respective buses 24A, 24B, 24C protected by a signal controllable circuit breaker 26. Power is provided via the buses to one or more loads 28A, 28B, 28C.

The circuit breaker 26 will open in case of a short circuit. However, it may not open in case of an arc flash 30 because the current flowing across the arc flash 30 is less than the bolting current of a short circuit, which trips the circuit breaker 26. Furthermore, delays associated with mechanical circuit breakers, such as the circuit breaker 26, may allow arc flash 30 energy to result in undesired equipment damage and possible personnel hazard.

To solve this problem, an arc crowbar 32 is connected in the circuit to quickly eliminate an arc flash according to aspects of the invention. It provides a gap electrode 34A, 34B, 34C connected to each respective phase A, B, C. A gap 35 or gaps separate these electrodes 34A, 34B, 34C from each other. The gap may be in air or another insulating gas such as nitrogen, sulphur hexa-fluoride, or any other suitable inert gas. A trigger device 36 in the gap 35 ionizes a localized portion of the insulating gas to initiate protective arcing 37 (best seen with reference to FIG. 2) between the electrodes 34A, 34B, 34C. This protective arcing 37 quickly absorbs energy from the electrical circuit 201, eliminating the hazardous arc flash 30. The electrodes 34A, 34B, 34C are enclosed in a strong, pressure tolerant vessel or case 38 which may include an acoustic shock wave absorber 41 to withstand explosive energy associated with the protective arc 37. The case 38 may be a pressure containment vessel made, for example, of steel, other metals or alloys, or plastic composites that can withstand the explosive equivalent of a calculated amount of TNT.

The low current (as compared to a short circuit) of the arc flash 30 makes early detection more difficult. For this reason one or more suitable sensors such as a differential current sensor 42 and/or an optical sensor 44 may be provided to detect an arc flash 30. Such sensors are known in the art.

The sensors 42, 44 are connected to a logic circuit 46 that produces a crowbar trigger activation command 48 upon detection of an arc 30. This instructs a trigger circuit 52 to provide a pulse 54 to the trigger 36, causing the trigger to ionize some gas in the gap 35 between the electrodes 34A, 34B, and 34C. This lowers the gap impedance, initiating the protective arc 37 between the electrodes 34A, 34B, 34C. The crowbar gap 35 may be designed for a given circuit voltage by the size and separation of the electrodes 34A, 34B, 34C, and by providing ablative material in the trigger as later described. Triggering lowers the impedance across the electrodes 34A, 34B and 34C so that the system current flows within the crowbar 32.

The gap 35 impedance may be designed to support an arc that draws enough current to open the circuit breaker 26. In addition to this, a circuit breaker trip signal 50 may be produced by the logic circuit 46 to open the circuit breaker 26. However, elimination of the arc flash is accomplished by the protective arc 37 before the circuit breaker 26 has time to open.

Figure 2:
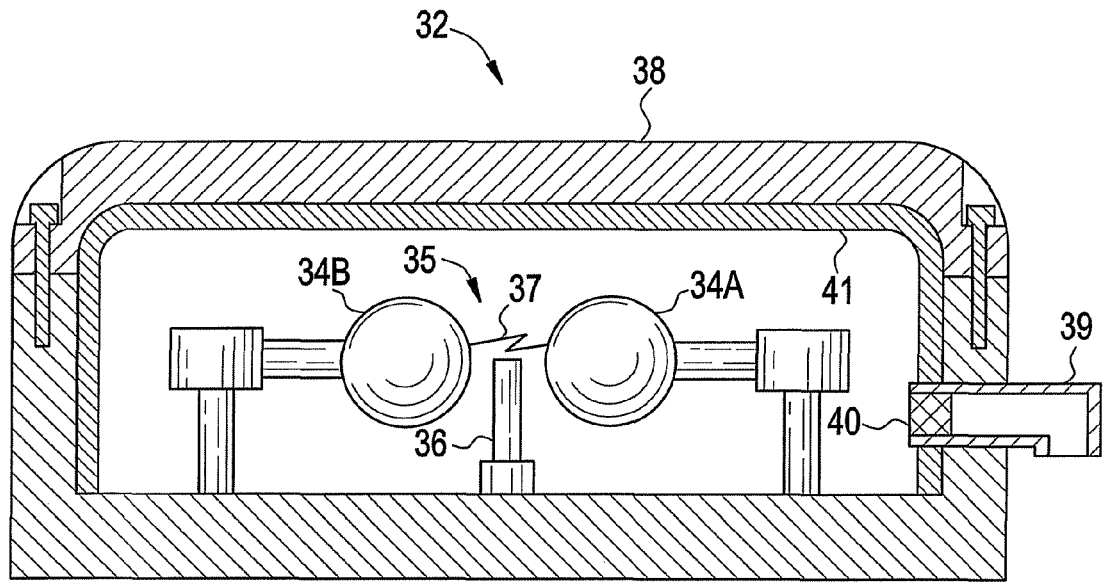
FIG. 2 is a sectional view of an arc crowbar case with sphere electrodes and a trigger pin in accordance with an embodiment of the invention.
Figure 3:
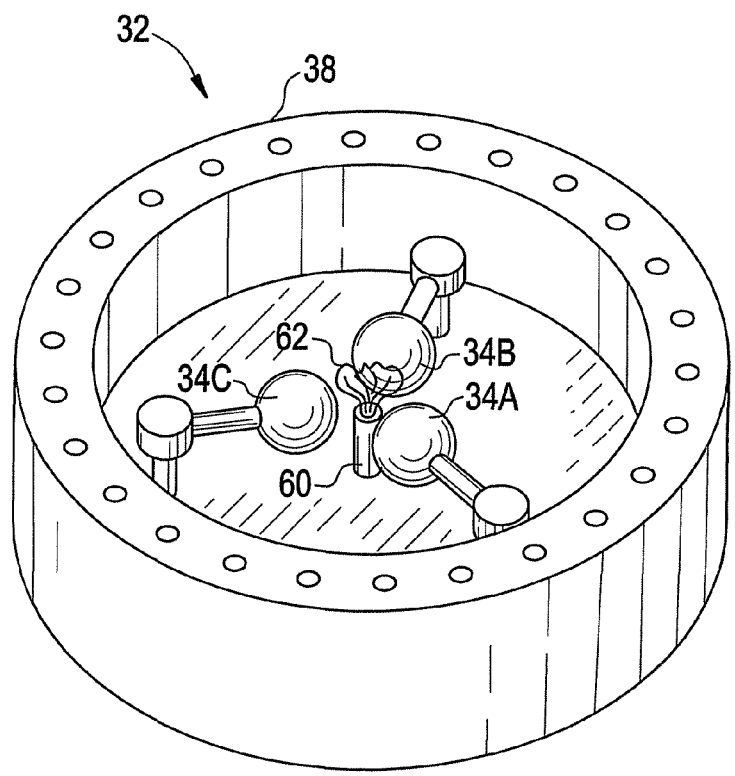
FIG. 3 is a perspective view of an arc crowbar with a plasma gun trigger in accordance with an embodiment of the invention.

FIG. 2 shows a sectional view of an arc crowbar case 38 with sphere electrodes 34A, 34B, and a trigger 36. The case may include a damping layer 41 to absorb an acoustical shock wave produced by the protective arc 37. The trigger 36 may be an electrode pin 36, an electrode pair, or a heating element that receives a pulse of current sufficient to ionize some of the gas between the main electrodes 34A, 34B. Alternately, the trigger may be an ablative plasma gun 60 (best seen with reference to FIG. 3) that injects a plasma of ablated material such as Polytetrafluoroethylene, acetal resin, Poly-methyle methacralate (PMMA) or any ablative polymers at supersonic speed into the inter-electrode gap 35. This creates a conducting channel between the electrodes, lowering the gap impedance quickly and dramatically for a fast and protective crowbar current response. FIG. 3 is a perspective view of an arc crowbar with three sphere electrodes 34A, 34B, 34C and a plasma gun trigger 60 injecting a plasma 62 between the electrodes 34A, 34B, 34C. One or more pressure relief vents 39 may be provided in the case 38. These vents 39 may be constantly open, controlling the release rate by the vent 39 size, or they may open only when pressure exceeds a given safe threshold by means of a valve or a burst plate. A filter 40 may be provided to prevent release of particulates. The internal wall of the vent may be made of ablative materials (e.g., Polytetrafluoroethylene, acetal resin, PMMA, or nylon etc.,) to cool the hot vapors and particulates, prior to venting outside the case 38.

Figure 4:
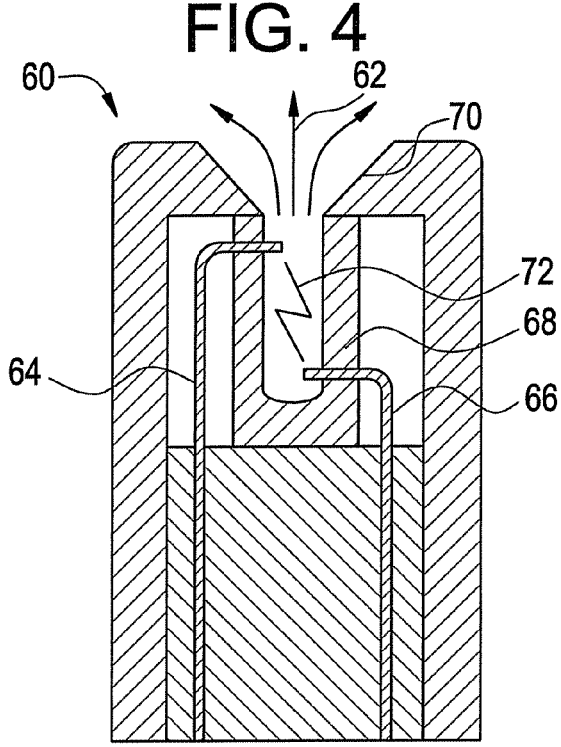
FIG. 4 is a sectional view of an ablative plasma gun trigger in accordance with an embodiment of the invention.

FIG. 4 is a sectional view of a plasma gun 60 with first and second electrodes 64, 66, a cup of ablative material 68 and a divergent nozzle 70. A brief pulse of electrical potential between the electrodes 64, 66 creates an arc 72 that heats and ablates some of the cup material 68 to create a highly conductive plasma 62. This plasma is injected in the gap 35 between the sphere electrodes 34A, 34B, and 34C as shown in FIG. 3 to initiate the protective arc 37 as shown in FIG. 2.

Figure 5:
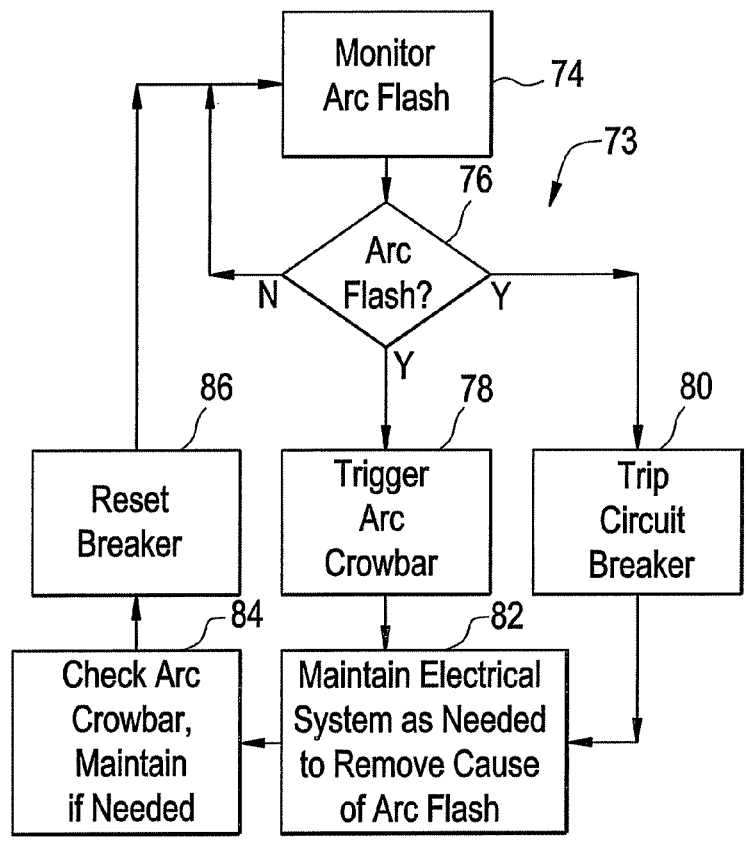
FIG. 5 is a flowchart of an arc flash elimination method in accordance with an embodiment of the invention.

In view of the foregoing, the circuit 201 facilitates a method of arc flash elimination. FIG. 5 schematically shows a method 73 for arc flash elimination according to embodiments of the invention. The method includes continuously sensing the circuit 74 for an arc flash 30. In response to determining 76 that the arc flash 30 occurs, the method includes triggering 78 the arc crowbar 32 and tripping 80 the circuit breaker 26. Following the triggering 78 of the arc crowbar 32, the method further includes maintaining 82 the electrical system to eliminate the cause of the arc flash 30, checking 84 the arc crowbar 32 for wear, and maintaining it if needed, and finally, resetting 86 the circuit breaker 26, returning the electrical system of the circuit 201 to service.

It has been found in experimental testing that an arc crowbar embodying aspects of the present invention is faster than any other known arc flash elimination technologies. The arc crowbar 32 was operated with an ablative plasma trigger and was tested in 3-phase circuits of 10-65 kilo Amperes. It achieved an energy transfer time of less than 0.2 ms after triggering with an 8/20 microsecond trigger pulse of 5 kA current. This response is about 15 times faster than the approximately 3 ms response time of currently known mechanical arc fault protection systems. Furthermore, the arc crowbar 32 avoids damage to the electrical circuit 201 from the sudden surge of bolting current produced by a mechanical crowbar. The arc crowbar 32 described herein absorbs 10-20% of the energy in the electrical system, as opposed to none absorbed by a mechanical crowbar. Furthermore, the arc crowbar 32 is robust, scalable, can be reusable several times before reconditioning, and should be less expensive and more reliable than other technologies, since it has no moving parts. The ablative plasma gun 60 requires little activation energy as noted above, and also has no moving parts.

The impedance of the inter-electrode gap 35 can be designed and controlled by various parameters, including the gap electrode 34A, 34B, 34C size and spacing and the trigger plasma 62 characteristics. The plasma 62 characteristics are determined by the spacing of the plasma gun electrodes 64, 66, the ablative cup 68 interior dimensions, the trigger pulse shape and energy, and the material of the cup 68. For example, in successful testing mentioned above, the crowbar electrodes 34A, 34B, 34C were 40 mm diameter spheres, each spaced 25 mm from the adjacent sphere or with sphere centers located at a radius of 37.52 mm from a common center point. The trigger was an ablative plasma gun 60 with a cup 68 made of acetal resin with an inner chamber diameter of 3 mm and chamber length of 8 mm. The nozzle 70 was located about 25 mm below the plane of the electrode 34A, 34B, 34C sphere centers. The cup 68 may be made of other ablative materials, as mentioned above, or combinations of materials if desired.

Figure 6:
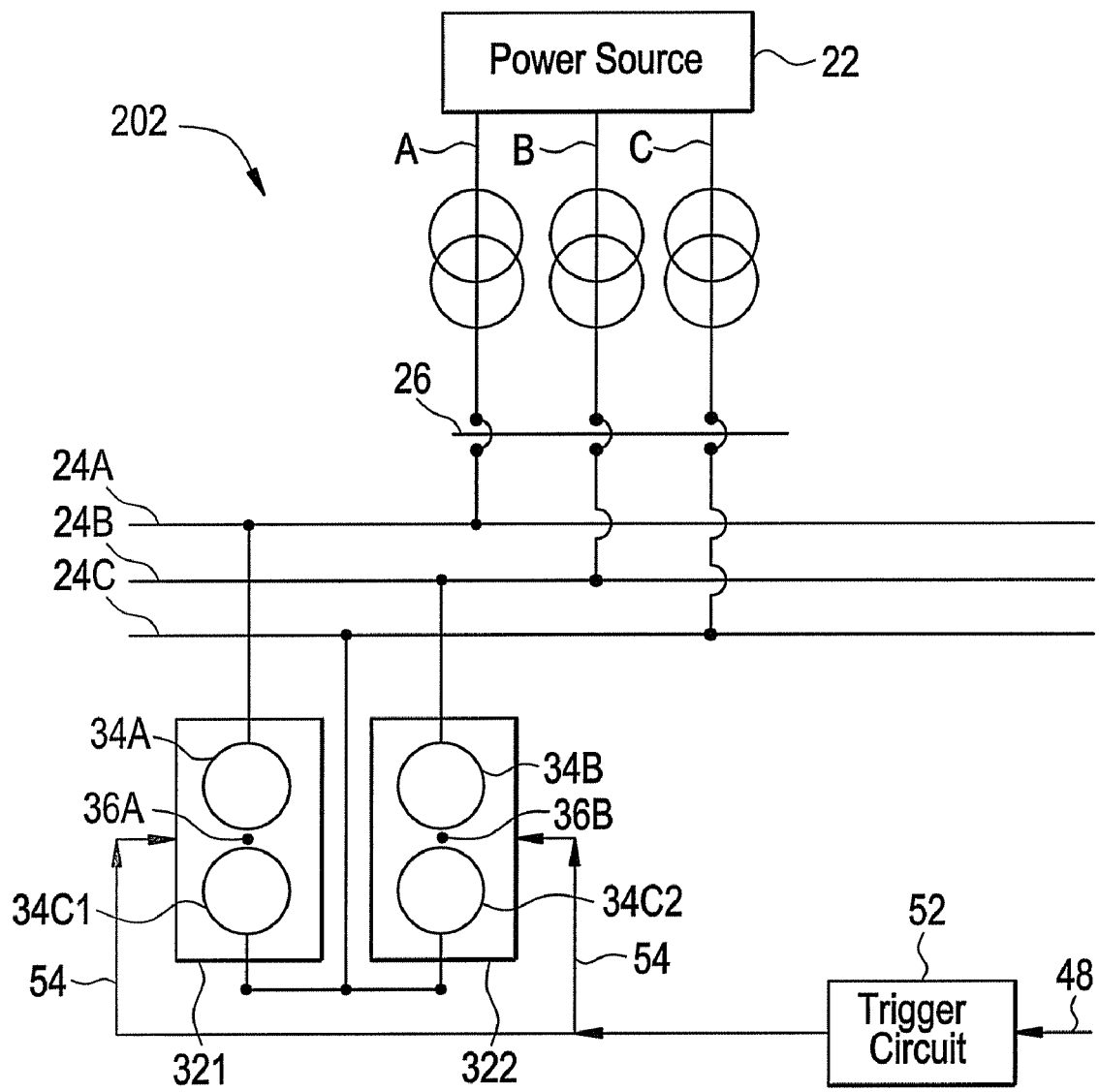
FIG. 6 is a schematic view of an arc crow bar in accordance with an embodiment of the invention.

The present apparatus may be configured in a variety of ways. For example, multiple arc crowbar units 32 may be configured to protect a circuit. FIG. 6 shows a second embodiment 202 of an arc crow bar embodying aspects of the invention such as comprising two arc crowbars 321, 322. The first arc crowbar 321 has first and second electrodes 34A, 34C1 separated by a first gap with a first arc triggering device 36A. The first electrode 34A is connected to a first phase A of the electrical circuit, and the second electrode 34C1 is connected to a third phase C of the electrical circuit. The second arc crowbar 322 has third and fourth electrodes 34B, 34C2 separated by a second gap with a second arc triggering device 36B. The third electrode 34B is connected to a second phase B of the electrical system and the fourth electrode 34C2 is connected to the third phase C of the electrical system.

Figure 7:
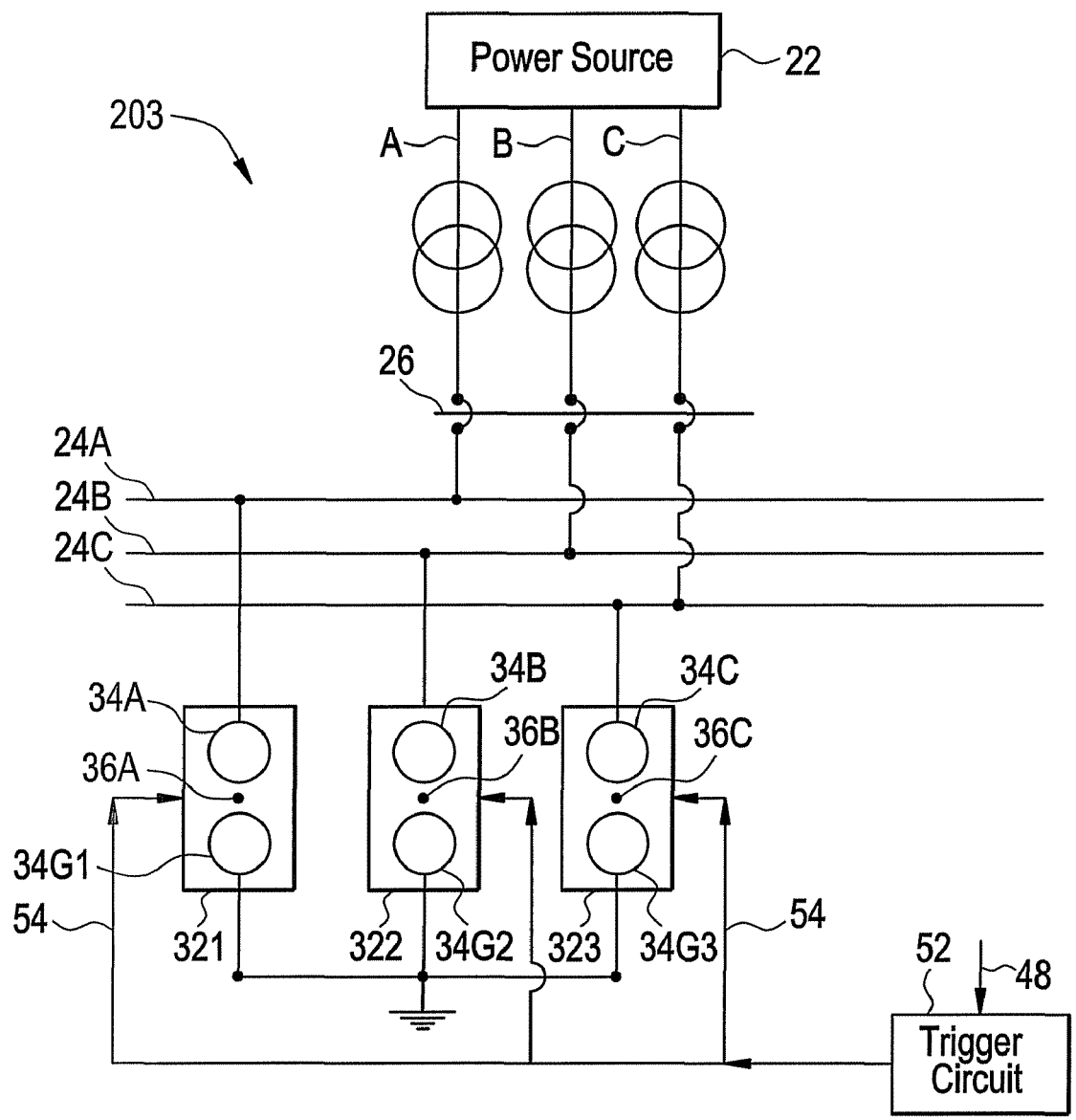
FIG. 7 is a schematic view of an arc crow bar in accordance with an embodiment of the invention.

FIG. 7 shows a third embodiment 203 of an arc crow bar embodying aspects of the invention such as comprising three arc crowbars 321, 322, 323. The first arc crowbar 321 has first and second electrodes 34A, 34G1 separated by a first gap with a first arc triggering device 36A. The first electrode 34A is connected to a first phase A of the electrical circuit. The second electrode 34G1 is connected to a ground. The second arc crowbar 322 has third and fourth electrodes 34B, 34G2 separated by a second gap with a second arc triggering device 36B. The third electrode 34B is connected to a second phase B of the electrical system and the fourth electrode 34G2 is connected to the ground. The third arc crowbar 323 has fifth and sixth electrodes 34C, 34G3 separated by a third gap with a third arc triggering device 36C. The fifth electrode 34C is connected to a third phase C of the electrical system and the sixth electrode 34G3 is connected to the ground.

Arc crowbars according to embodiments of the invention may be provided in modular units such as 321, 322, and 323 that can be installed in different configurations such as shown in FIGS. 6 and 7, for example. The main electrodes of these units may be provided with gap adjustment for adaptation to different voltages.

Figure 8:
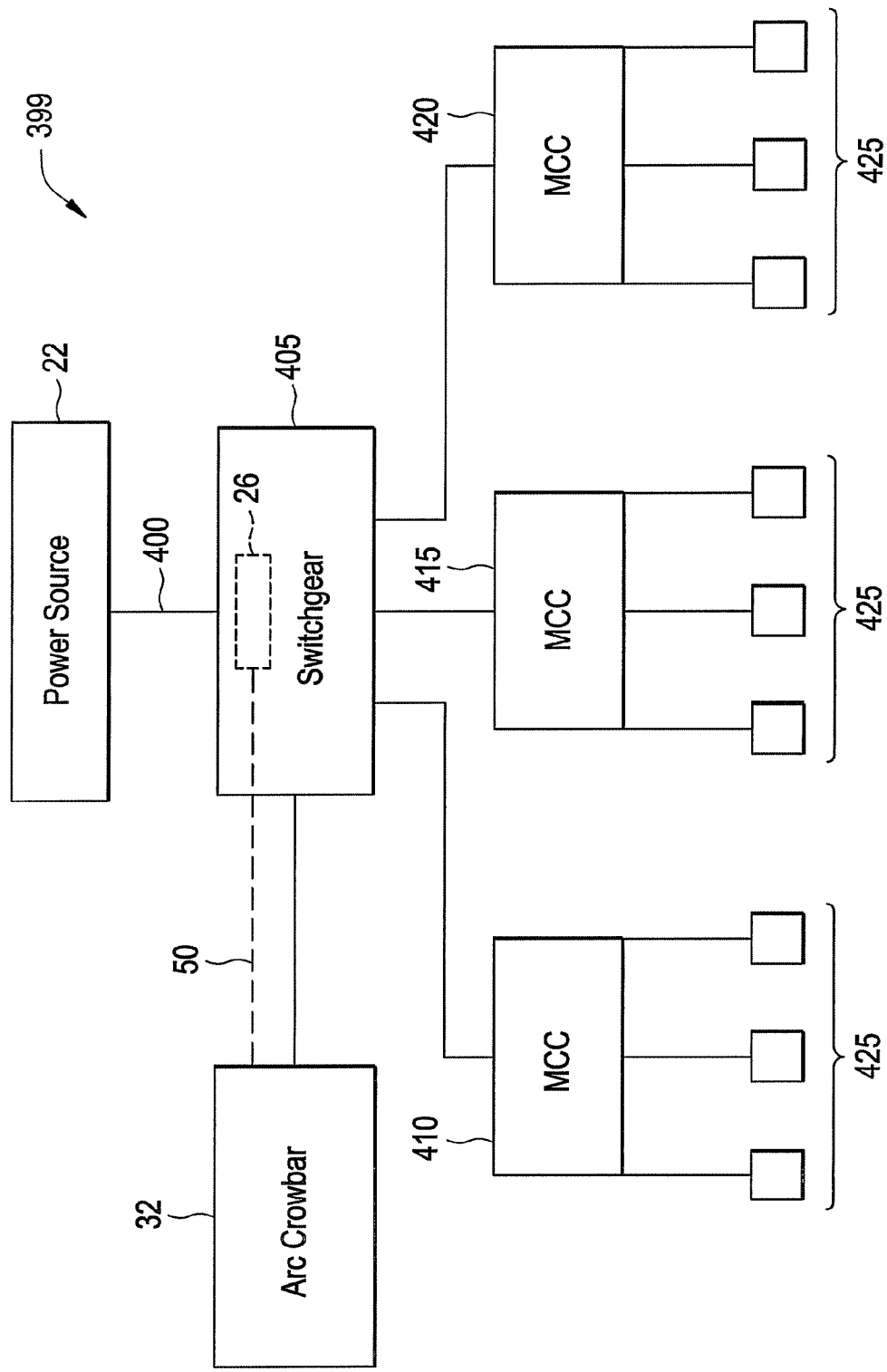
FIG. 8 is a block schematic diagram of a power distribution system in accordance with an embodiment of the invention.

FIG. 8 depicts a block schematic representation of an embodiment of a power distribution system 399 that may incorporate aspects of the arc crowbar 32 described and depicted herein. A power connector 400 is depicted between the power source 22 and a switchgear 405. It will be appreciated that while the power connector 400 is depicted as a single line, it may include more than one phase of power, such as the three phases A, B, and C depicted in FIG. 1, and a switching neutral (not shown). Power from the power source 22 is provided to the switchgear 405 including the circuit breaker 26. The switchgear 405 distributes power to one or more motor control centers (MCC) 410, 415, 420, which further distribute power to downstream electrical loads 425. As described above, in response to detection of the arc flash 30, the arc crowbar 32 eliminates the arc flash 30 and draws enough current to open the circuit breaker 26, thereby removing power from the MCCs 410, 415, 420 and downstream loads 425. In one embodiment, following detection of the arc 30, the arc crowbar 32 is productive of the circuit breaker trip signal 50 to open the circuit breaker 26. While the arc crowbar 32 is depicted separate from the switchgear 405 for illustration purposes, it will be appreciated that it may disposed integrally within the switchgear 405.

As described, the arc crowbar 32 depicted in FIG. 8 provides arc flash 30 protection within the switchgear 405, and subsequent to detection of an onset of such arc flash 30 within the switchgear 405, the circuit breaker 26 is opened, thereby removing power to all downstream loads 425 of the MCCs 410, 415, 420.

Figure 9:
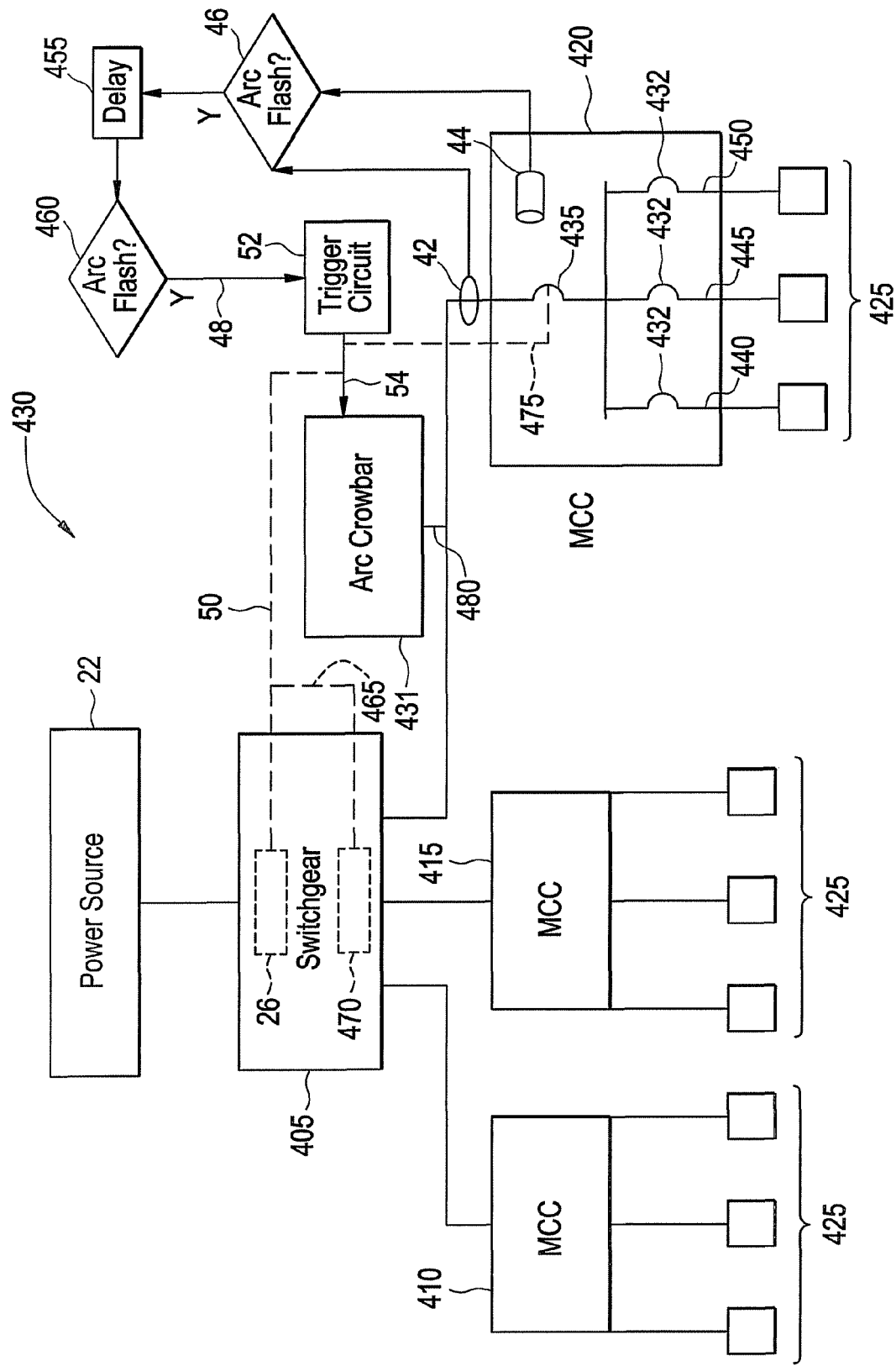
FIG. 9 is a block schematic diagram of a power distribution system in accordance with an embodiment of the invention.

FIG. 9 depicts a block schematic representation of an embodiment of an alternate power distribution system 430. An arc crowbar 431, such as the arc crowbar 32 depicted in FIG. 1 for example, is in power connection with the motor control center 420 and is responsive to the arc flash 30 condition of a sustained, defined duration corresponding to the motor control center 420 to eliminate the arc flash 30 condition. While FIG. 9 depicts the arc crowbar 431 in conjunction with one MCC 420, it will be appreciated that embodiments of the invention described herein can include more than one arc crowbar 431 in conjunction with more than one MCC, such as the MCCs 410, 415, 420 in power connection with a switchgear, such as the switchgear 405.

In an embodiment, the MCC 420 includes one or more fast acting current limiting circuit breakers 432 in power connection and fault protection communication with circuit branches 440, 445, 450. Each current limiting circuit breaker 432 is responsive to a level of current within the respective circuit branch 440, 445, 450 to interrupt current therein in response to an excessive level of current. Optionally, a main circuit breaker 435 may protect all branches 440, 445, 450 of the MCC 420. Like the circuit breaker 26, the main circuit breaker 435 may allow sufficient current flow to support the arc flash 30 without interruption, and may also include a response time insufficient for desired arc flash 30 elimination.

Current limiting breakers 432 are distinguished from circuit breakers 26 and 435 in that they provide sufficient sensitivity to interrupt an amount of current to sustain the arc flash 30. Further, such current limiting circuit breakers 432 often provide response times of eight to ten milliseconds (which is approximately one-half of a 60 cycles per second electrical cycle). Therefore, selective opening of the appropriate breaker 432 can eliminate any arc flash 30 that occurs downstream of the current limiting circuit breakers 432. Accordingly, arc flash 30 elimination via selective opening of the current limiting circuit breakers 432 enhances selectivity of the system 430 because the other breakers 432 and their corresponding loads 425 are unaffected, and remain operational. Such enhanced selectivity is desirable, as it reduces false triggers of the circuit breakers 435, 26 that can impact branches 440, 445, 450 that are otherwise operating properly. In some industries, such as material processing industries for example, it is highly desirable to reduce any interruptions of power, as such power interruptions may be highly disruptive to the processes.

In conjunction with the arc flash 30 protection offered by the current limiting circuit breakers 432 to the branches 440, 445, 450 disposed downstream of the circuit breakers 432, it is further desired to provide arc flash 30 elimination within the MCC 420. An embodiment of the invention provides both arc flash 30 elimination within the MCC 420 while enhancing selectivity, thereby reducing a possibility of unintended interruption of power service. In an embodiment, arc flash elimination within the MCC 420 and selectivity are provided by the arc crowbar 431, such as the arc crowbar 32 described herein in conjunction with the current limiting circuit breakers 432.

In an embodiment, sensors, such as at least one of the differential current sensor 42 and optical sensor 44 are in signal communication with the logic circuit 46 sense the arc flash 30 via conditions that accompany the arc flash 30. In response to detection of conditions that indicate a possible arc flash 30, the logic circuit 46 activates a delay 455. Following the delay 455, another logic circuit 460, also in signal communication with at least one of the sensors 42, 44 evaluates whether the conditions indicative of the arc flash 30 continue to exist. If the conditions indicative of the arc flash 30 continue to exist, the logic circuit 460 triggers the arc crowbar 431 via providing the crowbar trigger activation command 48 to the trigger circuit 52 to thereby provide the pulse 54 to the arc crowbar 431 to eliminate the arc flash 30 as described above. The amount of time delay provided by the delay circuit 455 is greater than a response time of the current limiting circuit breakers 432, thereby allowing the current limiting circuit breaker 432 to respond to any arc flash 30 downstream of the current limiting circuit breaker 432. In an embodiment, an appropriate time delay is contemplated to be about seven to ten milliseconds.

Therefore, if the cause of the conditions that indicate a potential arc flash 30 is below one of the current limiting circuit breakers 432, it will be eliminated by the current limiting circuit breaker 432 of the particular branch 440, 445, 450 in which the cause is contained, and will no longer exist following the delay 455. Accordingly, if subsequent to the delay 455, evaluation by the logic circuit 460 finds that the conditions that indicate the potential arc flash 30 are no longer present, power continues to be provided to the remaining branches 440, 445, 450 that are absent the arc flash 30 conditions, thereby providing the MCC 420 with arc flash 30 protection and enhanced selectivity.

Alternatively, if the conditions that indicate the potential arc flash 30 continue subsequent to the delay 455, it is an indication that the cause of the potential arc flash 30 is located upstream of the current limiting circuit breakers 432, and the arc crowbar 431 is activated. As described above, in addition to activation of the arc crowbar 32, the trigger circuit 52 may provide the circuit breaker trip signal 50 to the circuit breaker 26 corresponding to the motor control center 420. Preferably, to further enhance selectivity and prevent interruption of properly functioning MCCs (such as the MCCs 410, 415 in FIG. 9, the trigger circuit 52 may provide a circuit breaker trip signal 465 to a circuit breaker 470 within the switchgear 405 that is in power connection with, and corresponding to the particular MCC 420 associated with the detected arc flash 30. Alternatively, the trigger circuit 52 may provide a circuit breaker trip signal 475 to the circuit breaker 435 within the MCC 420.

In one embodiment, the arc crowbar 431 depicted in FIG. 9 is easily retrofitted to an existing MCC 420 by external attachment via a cable 480. Additionally, such retrofit installation requires an arc sensor, such as at least one of the differential current sensor 42 or optical sensor 44, for example. In another embodiment, the arc crowbar 431 may be directly installed within the MCC 420.

While an embodiment of the invention has been described and depicted with block diagrams of discrete logic circuit components, it will be appreciated that the scope of the invention is not so limited, and that the invention will also apply to arc crowbars 431 that may utilize integrated logic circuit components.

While the invention has been described with reference to exemplary embodiments, it will be understood that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A motor control center comprising
a circuit branch;
a current limiting circuit breaker in fault-protection communication with the circuit branch, the current limiting circuit breaker responsive to a level of current within the circuit branch to interrupt current therein; and
an arc crowbar in power connection with the motor control center, the arc crowbar responsive to an arc flash condition corresponding to the motor control center to eliminate the arc flash condition wherein the arc crowbar comprises,
a protective arc device comprising at least three gap electrodes separated by a gap in a gas in an enclosure, each gap electrode connected to an electrically different portion of an electrical circuit of the motor control center, and
an arc triggering device disposed proximate the gap, and configured to ionize a portion of the gas in the gap.

2. The motor control center of claim 1, further comprising:
a circuit breaker in fault protection communication with and disposed upstream of the circuit branch, the circuit breaker responsive to the arc crowbar to interrupt current within the motor control center.

3. The motor control center of claim 1, wherein the arc crowbar comprises:
a trigger circuit that sends an electrical pulse to the arc triggering device to activate it; and
an arc flash sensor responsive to the arc flash condition and productive of a signal to the trigger circuit to send the electrical pulse to the arc triggering device;
wherein the arc flash condition results in triggering the protective arc device to produce a protective arc that diverts energy from the arc flash condition, thereby eliminating the arc flash condition.

4. The motor control center of claim 3, wherein the gap between the gap electrodes has a lower electrical impedance than any other gaps or insulation between the electrically different portions of the electrical circuit in response to the arc triggering device ionizing the portion of gas between the gap electrodes.

5. The motor control center of claim 3, wherein the arc triggering device comprises a triggering electrode that triggers the protective arc by means of a voltage or current pulse to attain electrical breakdown of the gas.

6. The motor control center of claim 3, wherein the arc triggering device comprises a heating element that ionizes a portion of the gas in the gap to initiate the protective arc.

7. The motor control center of claim 3, wherein the arc triggering device comprises a plasma gun with a divergent nozzle that injects a plasma into the gap between the gap electrodes to initiate the protective arc.

8. The motor control center of claim 7, wherein the arc triggering device comprises an ablative plasma gun that injects a plasma of an ablated material into the gap between the gap electrodes to initiate the protective arc between the gap electrodes.

9. The motor control center of claim 8, further comprising:
a circuit breaker in fault protection communication with and disposed upstream of the circuit branch;
wherein the ablative plasma gun injects a plasma having sufficient conductivity to support a current in the protective arc that opens the circuit breaker.

10. The arc flash eliminator of claim 3 wherein the enclosed case comprises an inner acoustic shock wave absorbent layer.

11. A power distribution system comprising:
a switchgear;
a motor control center in power connection with the switchgear, the motor control center comprising:
a circuit branch;
a current limiting circuit breaker in fault protection communication with the circuit branch, the current limiting circuit breaker responsive to a level of current within the circuit branch to interrupt current therein; and
an arc crowbar in power connection with the motor control center, the arc crowbar responsive to an arc flash condition corresponding to the motor control center to eliminate the arc flash condition wherein the arc crowbar comprises,
a protective arc device comprising at least three gap electrodes separated by a gap in a gas in an enclosure, each gap electrode connected to an electrically different portion of an electrical circuit of the motor control center, and
an arc triggering device disposed proximate the gap, and configured to ionize a portion of the gas in the gap.

12. The power distribution system of claim 11, further comprising:
a circuit breaker disposed within the switchgear, the circuit breaker in fault protection communication with the motor control center and responsive to the arc crowbar to interrupt current to the motor control center.

13. The power distribution system of claim 12, wherein the arc crowbar comprises:
a trigger circuit that sends an electrical pulse to the arc triggering device to activate it; and
an arc flash sensor responsive to the arc flash condition and productive of a signal to the trigger circuit to send the electrical pulse to the arc triggering device;
wherein the arc flash condition results in triggering the protective arc device to produce a protective arc that diverts energy from the arc flash condition, thereby eliminating the arc flash condition.

* * * * *